United States Patent
Jany et al.

(10) Patent No.: US 9,859,991 B2
(45) Date of Patent: Jan. 2, 2018

(54) RADIOFREQUENCY COMMUNICATION DEVICE USING A TORP SIGNAL

(71) Applicant: Commissariat a L'Energie Atomique et aux Energies Alternatives, Paris (FR)

(72) Inventors: Clement Jany, Grenoble (FR); Alexandre Siligaris, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 129 days.

(21) Appl. No.: 14/792,814

(22) Filed: Jul. 7, 2015

(65) Prior Publication Data

US 2016/0028495 A1 Jan. 28, 2016

(30) Foreign Application Priority Data

Jul. 8, 2014 (FR) ..................... 14 56583

(51) Int. Cl.
*H04B 15/04* (2006.01)
*H04B 1/717* (2011.01)

(52) U.S. Cl.
CPC ........... *H04B 15/04* (2013.01); *H04B 1/7174* (2013.01)

(58) Field of Classification Search
CPC ................................ H04B 1/00; H03B 21/02
See application file for complete search history.

(56) References Cited

U.S. PATENT DOCUMENTS

2007/0116104 A1\* 5/2007 Fujiwara ............. H04B 1/7183
375/149
2014/0323062 A1\* 10/2014 Siligaris ................... H03L 7/18
455/76

FOREIGN PATENT DOCUMENTS

WO  WO 2008/069444 A1  6/2008
WO  WO 2013/079685 A1  6/2013

OTHER PUBLICATIONS

French Preliminary Search Report dated Apr. 2, 2015 in French Application 14 56583, filed on Jul. 8, 2014 (with English Translation of Categories of Cited Documents).
Nawreen Khan et al. "A Low Power Frequency Synthesizer for 60-GHz Wireless Personal Area Networks", IEEE Transactions on Circuits and Systems II: Express Briefs, vol. 58, No. 10, Oct. 1, 2011, 5 pages.

(Continued)

*Primary Examiner* — Jaison Joseph
(74) *Attorney, Agent, or Firm* — Oblon, McClelland, Maier & Neustadt, L.L.P.

(57) ABSTRACT

Radiofrequency communication device comprising at least one TORP signal generation circuit, the TORP signal corresponding to oscillations trains periodically repeated at a frequency $F_{PRP}$ for which the oscillation frequency is $F_{OL} > F_{PRP}$ and for which each oscillations train lasts for a duration of less than $1/F_{PRP}$, and at least one multiplier circuit for which an input is coupled to an output of said at least one TORP signal generation circuit such that it is capable of multiplying the TORP signal with a baseband signal comprising at least one of information intended to be transmitted by the radiofrequency communication device and a radiofrequency signal intended to be received by the radiofrequency communication device.

12 Claims, 8 Drawing Sheets

(56) References Cited

OTHER PUBLICATIONS

Kenichi Okada et al. "A Full 4-Channel 6.3Gb/s 60GHz Direct-Conversion Transceiver with Low-Power Analog and Digital Baseband Circuitry", Solid-State Circuits Conference Digest of Technical Papers (ISSCC), 2012 IEEE International, Feb. 19-23, 2012, 3 pages.

Alexandre Siligaris et al. "A 65nm CMOS Fully Integrated Transceiver Module for 60GHz Wireless HD Applications", IEEE International Solid-State Circuits Conference Digest of Technical Papers (ISSCC), Feb. 20-24, 2011, 3 pages.

A. Siligaris et al. "A 60 GHz UWB Impulse Radio Transmitter with Integrated Antenna in CMOS65nm SOI Technology", IEEE Silicon Monolithic Integrated Circuits in RF Systems (SiRF), Jan. 17-19, 2011, 4 pages.

* cited by examiner

RADIOFREQUENCY COMMUNICATION DEVICE USING A TORP SIGNAL

TECHNICAL DOMAIN AND PRIOR ART

The domain of the invention is radiofrequency (RF) communication systems and more precisely RF signal transmission and/or reception devices.

An RF signal transmission device transforms a baseband signal into an RF signal that can be transmitted in a propagation channel, and a reception device transforms a received RF signal into a baseband signal. There are three families of architectures of RF transmission and reception devices used to make these transformations. The choice of the architecture family depends particularly on the type of baseband signal to be transmitted (modulation used, signal passband, etc.), the value of the RF signal carrier frequency and the nature of the propagation channel used for the transmission.

The first of these three families corresponds to direct transposition transmission and reception devices. This type of architecture uses a local oscillator (usually a phase locked loop (PLL)) that generates a periodic signal at the carrier frequency (for example a sinusoidal signal), a mixer and an amplifier. A differentiation is made between the transmission and reception systems. On transmission, the baseband signal is multiplied (in the time domain) by the signal outputted from the local oscillator and is then amplified to be transmitted in the propagation channel to the RF band. On reception, the received RF signal is amplified and is then multiplied by the signal outputted from the local oscillator to be returned to the baseband. The complexity of the baseband signal that can be transmitted, and the transmission quality depend very closely on the stability in time and the spectral purity of the signal outputted from the local oscillator. The document entitled <<A full 4-channel 6.3 Gb/s 60 GHz direct-conversion transceiver with low-power analog and digital baseband circuitry>> by K. Okada and al., Solid-State Circuits Conference Digest of Technical Papers (ISSCC), 2012 IEEE International, February 19-23 2012, pages 218-220, describes an example of a transmission and reception device belonging to this first family of architectures.

The second of these three families corresponds to indirect transposition transmission and reception devices. These architectures are different from those in the first family in that they use several mixers. In this type of architecture, one or several local oscillators that may or may not be independent of each other generate different reference frequencies that are sent as inputs to a number of mixers equal to the number of reference frequencies, these mixers being arranged in series. Therefore the transposition between the baseband frequency and the RF frequency is made in several steps. An amplifier is also used. A differentiation is made between transmission and reception systems: on transmission, the baseband signal is multiplied by the first reference frequency, and the signal obtained is then multiplied by the second reference frequency, and so on for all reference frequencies. The sum of reference frequencies forms the RF carrier frequency at which the baseband signal is transposed. The RF signal obtained at the end of the string is amplified so that it can be transmitted in the propagation channel. On reception, the received RF signal is amplified and is then multiplied by the first reference frequency, and the signal obtained is then multiplied by the second reference frequency and so on for all the reference frequencies until the baseband signal is obtained. The document entitled <<A 65 nm CMOS fully integrated transceiver module for 60 GHz wireless HD applications>> by A. Siligaris and al., IEEE International Solid-State Circuits Conference Digest of Technical Papers (ISSCC), 2011, San Francisco, February 20-24 2011, pages 162-164, describes an example of a transmission and reception device belonging to this second family of architectures.

The third family includes transmission and reception systems that do not use a frequency multiplication to transpose the baseband signal into an RF signal (on transmission) and to transpose the RF signal into a baseband signal (on reception), for example such as systems using an OOK (On-Off Keying) modulation in which, on transmission, the information to be transmitted is directly modulated at the required RF frequency, and on reception, the received RF signal is directly demodulated in the baseband. The document entitled <<A 60 GHz UWB impulse radio transmitter with integrated antenna in CMOS 65 nm SOI technology>> by A. Siligaris and al., IEEE Silicon Monolithic Integrated Circuits in RF Systems (SiRF), 2011, Phoenix, USA, January 17-19 2011, pages 153-156, describes an example of a transmission and reception device belonging to this third family of architectures.

In modern RF systems, regardless of the architecture family, the carrier frequencies used are generally high (several tens of GHz), which implies the use of complex PLLs to generate the reference frequency(ies) necessary to achieve such carrier frequencies. Consequently, formation of these PLLs requires high electricity consumption and large circuits. Furthermore, the difficulty in generating a high reference frequency with a very high spectral purity requires the use of architectures belonging to the second architecture family described above in which several lower reference frequencies are used, at the detriment of the electrical consumption and the size of the circuits. Finally, in transmission and reception devices belonging to the third family of architectures, modulation and transformation of the baseband signal to the RF band are dependent on each other, which limits the complexity of transmittable modulations and therefore the throughput that can be obtained with this type of architecture.

Document WO 2013/079685 A1 describes a transmission and reception device comprising a frequency synthesis device that, starting from a low frequency, is based on generation of a complex periodic signal centred at a higher frequency and subsequent frequency recovery by an injection locked oscillator (ILO) in order to obtain a periodic signal with stabilised frequency used to transpose the baseband signal to the RF frequency and to transpose a received RF signal into the baseband. Although this type of architecture avoids the use of complex PLLs for generating reference frequencies used for transpositions to the required carrier frequencies, the use of an injection locked oscillator circuit requires non-negligible electricity consumption (for example about one third of the total power of the transmission or reception circuit), particularly to make transmissions at high throughputs of several Gbits/s.

PRESENTATION OF THE INVENTION

Thus there is a need to propose a new type of radiofrequency communication device that does not have the disadvantages of devices according to prior art, in other words with lower electricity consumption and a moderate size, even for high throughputs, and for which the choice of modulation that can be applied to the transmitted signals is not limited.

To achieve this, one embodiment discloses a radiofrequency communication device comprising at least one TORP signal generation circuit, the TORP signal corresponding to oscillations trains periodically repeated at a frequency $F_{PRP}$ for which the oscillation frequency is $F_{OL} > F_{PRP}$ and for which each oscillations train lasts for a duration of less than $1/F_{PRP}$, and at least one multiplier circuit for which an input is coupled to an output of said at least one TORP signal generation circuit such that it is capable of multiplying the TORP signal with a baseband signal comprising information intended to be transmitted by the radiofrequency communication device and/or with a radiofrequency signal intended to be received by the radiofrequency communication device.

Therefore the radiofrequency communication device makes use of a TORP (or PROT, or Periodically Repeated Oscillations Train) type signal forming sets of periodically repeated oscillations, to carry out the frequency transposition of signals to be transmitted and/or received signals. The use of a TORP signal instead of a sinusoidal signal to achieve this frequency transposition can give a better signal to noise ratio for transmission and/or reception of signals. Unlike the device disclosed in document WO 2013/079685 A1, the fact of not using injection locked oscillators can reduce the electricity consumption of the radiofrequency communication device, particularly for communications of several Gbits/s at high frequencies.

The device can advantageously be used to make contactless communications within integrated circuits, for example between a processor and a memory, so that data can be transmitted between elements of the integrated circuit, or between several integrated circuits, without a physical bus.

The device can also advantageously be used to make short distance communications with a sufficiently low power so that it does not interfere with any other nearby communications made within frequency ranges similar to the frequency range used by the device.

The device may correspond either to a signal transmission device, or to a signal reception device, or to a signal transceiver device, that is a signal transmission and reception device.

Said at least one multiplier circuit may correspond to a first multiplier circuit capable of multiplying the TORP signal with the baseband signal and to a second multiplier circuit capable of multiplying the TORP signal with the radiofrequency signal. The first multiplier circuit can be used to transpose the baseband to the RF band during a signal transmission, and the second multiplier circuit can be used to transpose the RF band to the baseband during a signal reception.

A single TORP signal generation circuit can generate a single TORP signal that can be used both for transmission and reception of signals. As a variant, said at least one TORP signal generation circuit may correspond to a first TORP signal generation circuit for which one output is coupled to an input of the first multiplier circuit (therefore used for transmitting signals) and to a second TORP signal generation circuit for which one output is coupled to an input of the second multiplier circuit (therefore used for signal reception).

The device may also comprise at least two switches, called first and second switches, capable of coupling the output of the TORP signal generation circuit or at least one of the TORP signal generation circuits with the input of the multiplier circuit or of at least one of the multiplier circuits by connecting them to each other either directly or by means, or a first circuitry, capable of using the TORP signal to generate a periodic signal for which the frequency spectrum comprises a principal line corresponding to one of the lines in the TORP signal spectrum and acting as a passband filter applied to the TORP signal and rejecting lines other than the main line of said periodic signal from the frequency spectrum of said periodic signal. In this case, the device may be used either in energy-saving operation (transmission and/or reception) without making use of said means generating the periodic signal, or in an operation consuming more energy that makes use of said means generating the periodic signal but that might be more appropriate in some cases, for example during communications in narrow frequency bands.

The means, or the first circuitry, capable of generating said periodic signal may comprise at least one injection locked oscillator (ILO) intended to receive the TORP signal as input and be at least periodically locked to the frequency at which the principal line of said periodic signal is located.

The TORP signal generation circuit or at least one of the TORP signal generation circuits may comprise at least:
  an oscillator capable of generating a periodic signal with frequency $F_{OL}$, and
  means, or a second circuitry, that can be controlled by a periodic signal with frequency $F_{PRP}$, and that are connected to an electrical power supply input of the oscillator such that they generate a non-zero oscillator power supply voltage only during part of each period $1/F_{PRP}$, or connected to an output of the oscillator such that they cut off an electrical connection between the oscillator output and an output of the TORP signal generation circuit during only part of each period $1/F_{PRP}$.

The device may also comprise at least one switch, called the third switch, capable of outputting either the periodic signal with frequency $F_{PRP}$ in a first configuration, or the baseband signal in a second configuration, onto a control input of means, or of the second circuitry, of the TORP signal generation circuit or of the first TORP signal generation circuit, and at least one switch called the fourth switch capable of outputting either the baseband signal in the first configuration, or a constant amplitude signal corresponding to the amplitude of a bit with value <<1>> in the second configuration, onto an input of the multiplier circuit or of the first multiplier circuit. Thus, the device can operate in transmission such that in the first configuration, the multiplier circuit or the first multiplier circuit makes a frequency transposition from the baseband to the RF band, and such that in the second configuration, the multiplier circuit or the first multiplier circuit makes an OOK modulation of the signal to be transmitted.

The device may also comprise at least one phase locked loop capable of outputting the periodic signal with frequency $F_{PRP}$.

Another embodiment concerns a radiofrequency communication method, comprising at least:
  the generation of at least one TORP signal corresponding to oscillations trains periodically repeated at a frequency $F_{PRP}$ of which the oscillations are at frequency $F_{OL} > F_{PRP}$ and for which each oscillations train has a duration of less than $1/F_{PRP}$,
  multiplication of the TORP signal with a baseband signal comprising information that will be transmitted and/or with a received radiofrequency signal.

The method may comprise the implementation of a first multiplication between a first TORP signal and the baseband signal, and/or a second multiplication between a second TORP signal and the received radiofrequency signal.

BRIEF DESCRIPTION OF THE DRAWINGS

This invention will be better understood after reading the description of example embodiments given purely for guidance and in no way limitative with reference to the appended drawings in which.

Identical, similar or equivalent parts of the different figures described below have the same numeric reference to facilitate comparison between the different figures.

The different parts shown in the figures are not necessarily all shown at the same scale, to make these figures more easily legible.

The different possibilities (variants and embodiments) shall be understood as not being exclusive of each other and may be combined with each other.

DETAILED PRESENTATION OF PARTICULAR EMBODIMENTS

Figure 1:
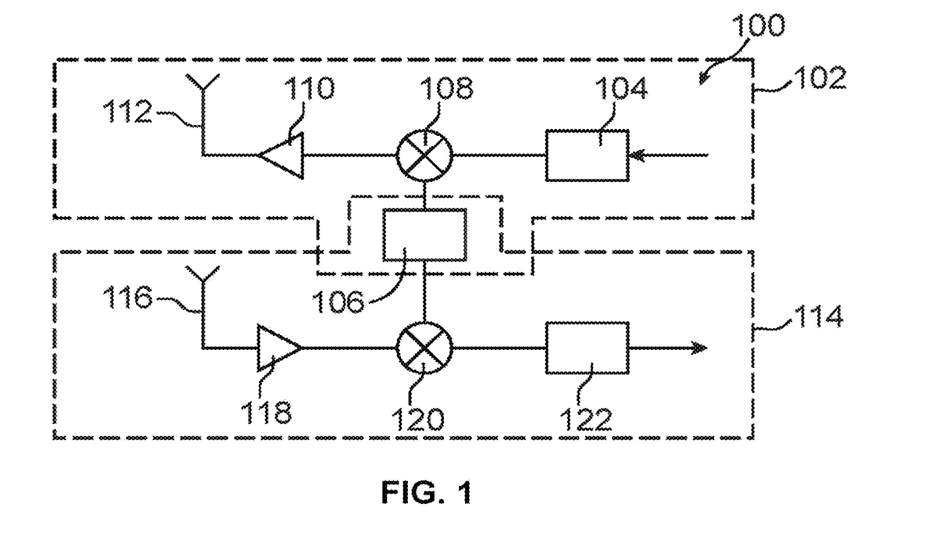
FIG. 1 diagrammatically shows a radiofrequency communication device according to a first embodiment.

Refer firstly to FIG. 1 that diagrammatically shows a first embodiment of a radiofrequency communication device 100.

The device 100 comprises a part 102 symbolically delimited by dashed lines and that is used to make transmission of signals in the RF domain. This part 102 of the device 100 comprises a first baseband signal processing circuit 104 receiving input consisting of information to be transmitted, and outputting a baseband signal to be transmitted, called the $BB_{TX}$ signal. The part 102 also comprises a circuit 106 forming means of generating a TORP type signal, in other words a signal forming Periodically Repeated Oscillations Trains, and a first multiplier circuit 108 capable of multiplying the $BB_{TX}$ signal and the TORP signal in the time domain, this multiplication in the time domain corresponding to a convolution product between the TORP and $BB_{TX}$ signals in the frequency domain, so that the $BB_{TX}$ signal can be transposed to the required carrier frequency (defined through the TORP signal), outputting an RF signal called the $RF_{TX}$ signal at the output. The part 102 also comprises a power amplifier 110 and a transmission antenna 112 to transmit the $RF_{TX}$ signal in an RF propagation channel.

The device 100 also comprises a part 114 symbolically delimited by dashed lines and capable of receiving an RF signal from the RF propagation channel. This part 114 of the device 100 comprises a reception antenna 116 and a low noise amplifier 118 outputting an $RF_{RX}$ signal corresponding to the amplified received RF signal. The part 114 also comprises a second multiplier circuit 120 multiplying the $RF_{TX}$ signal and the TORP signal outputted from the circuit 106 in the time domain, which corresponds to a convolution product between the $RF_{RX}$ and TORP signals in the frequency domain, thus transposing the $RF_{RX}$ signal into baseband forming a signal called the $BB_{RX}$ signal. The part 114 also comprises a second baseband processing circuit 122 receiving the $BB_{RX}$ signal as an input, and outputting information transmitted in the received RF signal.

In this first embodiment, the same TORP signal is used both for transmission and for reception. Thus, the circuit 106 that generates the TORP signal forms part of the part 102 comprising elements performing signal transmission and also of the part 114 comprising elements performing signal reception.

Unlike transmission and reception devices according to prior art in which one or several sinusoidal signals are generated by one or several local oscillators and are multiplied either by the baseband signal in transmission or by the RF signal in reception, the signal used for frequency transposition of the baseband signal in transmission and of the RF signal in reception corresponds to a TORP type signal for which the characteristics are described in detail below.

The TORP signal used for transmission and for reception of signals may or may not be coherent, depending on the elements forming the circuit 106 generating it.

A coherent TORP signal is defined in the time domain as the result of a convolution between a first signal called $g_1(t)$ corresponding to a frequency sine $F_{OL}$ windowed in width $\alpha/F_{PRP}$ (where $0<\alpha<1$) and a second signal $h_1(t)$ corresponding to a Dirac comb with period $1/F_{PRP}$:

$$g_1(t) = \sin(2 \cdot \pi \cdot F_{OL} \cdot t) \cdot \Pi\left(t \frac{F_{PRP}}{\alpha}\right) \quad (1)$$

$$h_1(t) = \sum_{k=-\infty}^{+\infty} \delta\left(t - \frac{k}{F_{PRP}}\right) \quad (2)$$

The signal resulting from this convolution is a coherent TORP signal called $torp_1(t)$, corresponding to trains or sets of frequency oscillations $F_{OL}$ repeated periodically at frequency $F_{PRP}$, and that is defined by the following relation:

$$torp_1(t) = \quad (3)$$
$$g_1(t) * h_1(t) = \left[\sin(2 \cdot \pi \cdot F_{OL} \cdot t) \cdot \Pi\left(t \frac{F_{PRP}}{\alpha}\right)\right] * \sum_{k=-\infty}^{+\infty} \delta\left(t - \frac{k}{F_{PRP}}\right)$$

The frequency of coherent TORP signal oscillations is equal to $F_{OL}$. The duration of each oscillations train is equal to $\alpha/F_{PRP}$, these oscillations trains being repeated every $1/F_{PRP}$, in other words periodically repeated at the frequency $F_{PRP}$.

Such a TORP signal is qualified as being coherent because its oscillations trains have the property of being coherent in phase, in other words the phase at the start of each oscillations train every $1/F_{PRP}$, is always the same.

In the frequency domain, the coherent TORP signal corresponds to the multiplication between a cardinal sine centred on $F_{OL}$ called $G_1(f)$ (corresponding to the frequency spectrum of signal $g_1(t)$) and a Dirac comb with period $F_{PRP}$ called $H_1(f)$ (corresponding to the frequency spectrum of signal $h_1(t)$):

$$G_1(f) = \frac{1}{2j}[\delta(f - F_{OL}) - \delta(f + F_{OL})] * \frac{\alpha}{F_{PRP}} \cdot \text{sinc}\left(\pi \cdot f \cdot \frac{\alpha}{F_{PRP}}\right) \quad (4)$$

$$H_1(f) = F_{PRP} \cdot \sum_{k=-\infty}^{+\infty} \delta(f - k \cdot F_{PRP}) \quad (5)$$

The result of this multiplication, called $TORP_1(f)$ and corresponding to the frequency spectrum of signal $torp_1(t)$, is a discrete spectrum with lines at multiple frequencies of $F_{PRP}$ and the envelope of which is a cardinal sine:

$$|TORP_1(f)|_{f>0} = G_1(f) \cdot H_1(f) \quad (6)$$

$$|TORP_1(f)|_{f>0} =$$

$$\left[\frac{1}{2}\delta(f - F_{OL}) * \frac{\alpha}{F_{PRP}} \cdot \text{sinc}\left(\pi \cdot f \cdot \frac{\alpha}{F_{PRP}}\right)\right] \cdot F_{PRP} \cdot \sum_{k=0}^{+\infty} \delta(f - k \cdot F_{PRP})$$

Figure 2:
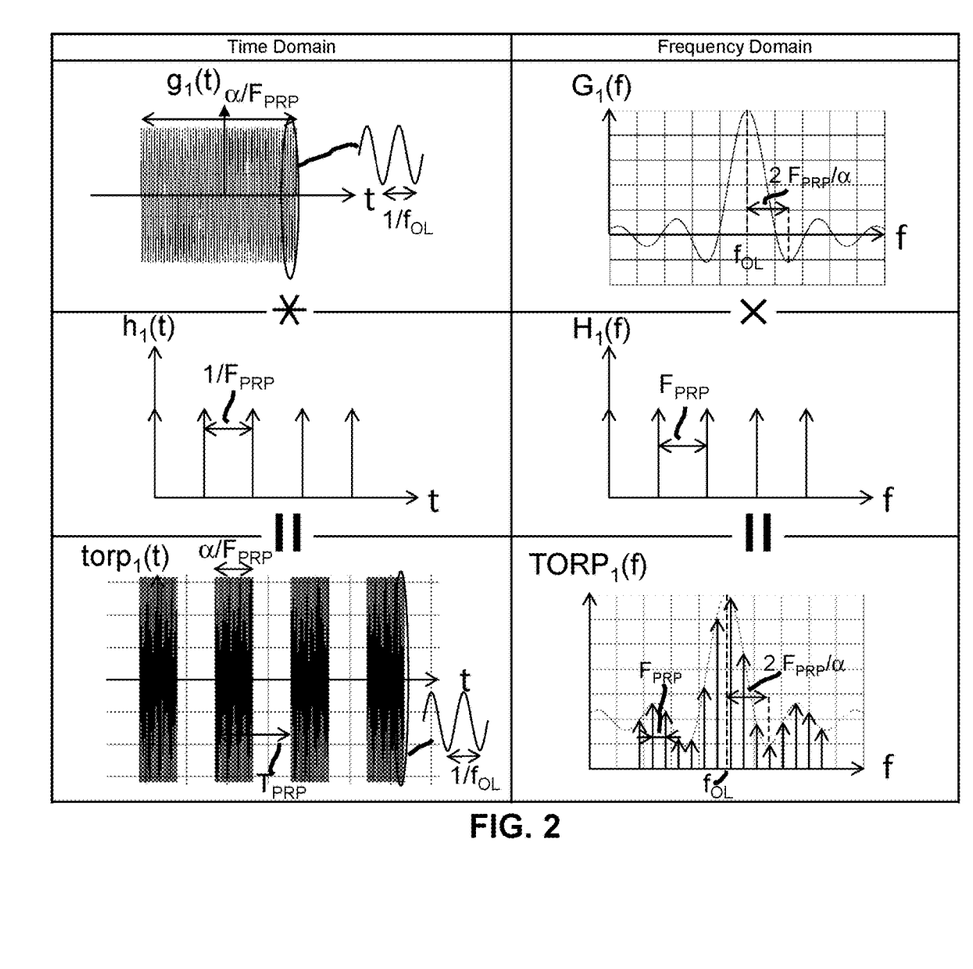
FIGS. 2 and 3 show TORP signals according to two different embodiments in the time and frequency domains used within a radiofrequency communication device.

The different signals described above for the coherent TORP signals are shown in FIG. 2. In particular, this figure shows that the lines in the spectrum corresponding to the $TORP_1(f)$ signal are located at multiple frequencies of $F_{PRP}$ and the amplitudes of these lines are defined by the envelope signal corresponding to $G_1(f)$. The frequency $F_{OL}$ is preferably chosen so that it is close to or equal to one of the multiple frequencies of $F_{PRP}$ so that one of the lines of signal $TORP_1(f)$ is located at the maximum amplitude or close to the maximum of the envelope and therefore that the amplitude of this line is equal to this maximum. In the example shown in FIG. 2, this frequency $F_{OL}$ shown in dashed lines on signal $TORP_1(f)$ is not equal to a multiple of $F_{PRP}$ and therefore none of the lines in signal $TORP_1(f)$ is at an amplitude equal to the maximum amplitude of the envelope signal.

Such a coherent TORP signal is for example obtained by using a circuit 106 like that shown in FIG. 9 (the device 100 shown in FIG. 9 will be described in detail later). In this FIG. 9, the circuit 106 comprises a PLL, or a frequency synthesis 124 that can lock and stabilise the frequency of a periodic signal with frequency $F_{PRP}$, for example a sinusoidal signal outputted by an oscillator not shown in FIG. 9 and with a frequency of more than about 1 GHz, and can output this frequency stabilised periodic signal. As a variant, this PLL or frequency synthesis 124 may be replaced by any device or structure capable of directly providing a periodic signal with frequency $F_{PRP}$ stable in frequency such as a resonator device. The circuit 106 also comprises a VCO (voltage controlled oscillator) 126 capable of outputting a periodic signal with frequency $F_{OL}$, for example less than or equal to 10 GHz or equal to several tens of GHz, and controlled electrical power supply means 128 electrically powering the oscillator 126 and that are controlled by the signal outputted by the PLL or frequency synthesis 124. These means 128 comprise for example a switch located between an electrical power supply input of the oscillator 126 and an electrical power supply, and that can be controlled by the periodic signal outputted by the PLL or frequency synthesis 124 or as in the example in FIG. 9, a controlled current source functioning either as a switch periodically interrupting the electrical power supply of the oscillator 126 at the frequency of the signal outputted by the PLL or frequency synthesis 124. This controlled current source may correspond to a MOS transistor, the signal outputted by the PLL or frequency synthesis 124 being applied to the gate of this transistor. A control voltage is also applied to the input of the oscillator 126 so as to control the frequency value of the signal outputted by the oscillator 126.

A non-coherent TORP signal is defined in the time domain as the result of a multiplication between a first signal called $g_2(t)$ corresponding to a sine curve with frequency $F_{OL}$ and a second signal $h_2(t)$ corresponding to a square signal with period $1/F_{PRP}$ and cyclic ratio $\alpha$:

$$g_2(t) = \sin(2 \cdot \pi \cdot F_{OL} \cdot t) \quad (7)$$

$$h_2(t) = \sum_{k=-\infty}^{+\infty} \delta\left(t - \frac{k}{F_{PRP}}\right) * \Pi\left(t \frac{F_{PRP}}{\alpha}\right) \quad (8)$$

The signal resulting from this multiplication is a non-coherent TORP signal called $torp_2(t)$, corresponding to oscillations trains with frequency $F_{OL}$ periodically repeated at frequency $F_{PRP}$ and that is defined by the following equation:

$$torp_2(t) = \quad (9)$$

$$g_2(t) \cdot h_2(t) = \sin(2 \cdot \pi \cdot F_{OL} \cdot t) \cdot \left[\sum_{k=-\infty}^{+\infty} \delta\left(t - \frac{k}{F_{PRP}}\right) * \Pi\left(t \frac{F_{PRP}}{\alpha}\right)\right]$$

The frequency of oscillations of the non-coherent TORP signal is equal $F_{OL}$. The duration of each oscillations train is equal to $\alpha/F_{PRP}$, these oscillations trains being repeated every $1/F_{PRP}$, in other words they are periodically repeated at frequency $F_{PRP}$.

Unlike the previous coherent TORP signal, oscillations trains of the non-coherent TORP signal are not necessarily coherent in phase, in other words the phase at the start up of each oscillations train, in other words every $1/F_{PRP}$, may be different.

In the frequency domain, the non-coherent TORP signal corresponds to the convolution between a Dirac at frequency $F_{OL}$, called $G_2(f)$ and corresponding to the frequency spectrum of $g_2(t)$, and a cardinal sine discretised at multiple frequencies of $F_{PRP}$ called $H_2(f)$ and corresponding to the frequency spectrum of $h_2(t)$:

$$G_2(f) = \frac{1}{2j}[\delta(f - F_{OL}) - \delta(f + F_{OL})] \quad (10)$$

$$H_2(f) = F_{PRP} \cdot \sum_{k=-\infty}^{+\infty} \delta(f - k \cdot F_{PRP}) \cdot \frac{\alpha}{F_{PRP}} \cdot \text{sinc}\left(\pi \cdot f \cdot \frac{\alpha}{F_{PRP}}\right) \quad (11)$$

The result of this convolution called $TORP_2(f)$ and corresponding to the frequency spectrum of signal $torp_2(t)$ is a translation of the discretised cardinal sine $H_2(f)$ around the frequency $F_{OL}$:

$$|TORP_2(f)|_{f>0} = G_2(f) * H_2(f) = H_2(f - F_{OL}) \quad (12)$$

$$|TORP_2(f)|_{f>0} =$$

$$F_{PRP} \cdot \sum_{k=0}^{+\infty} \delta(f - F_{OL} - k \cdot F_{PRP}) \cdot \frac{\alpha}{F_{PRP}} \cdot \text{sinc}\left(\pi \cdot (f - F_{OL}) \cdot \frac{\alpha}{F_{PRP}}\right)$$

Figure 3:
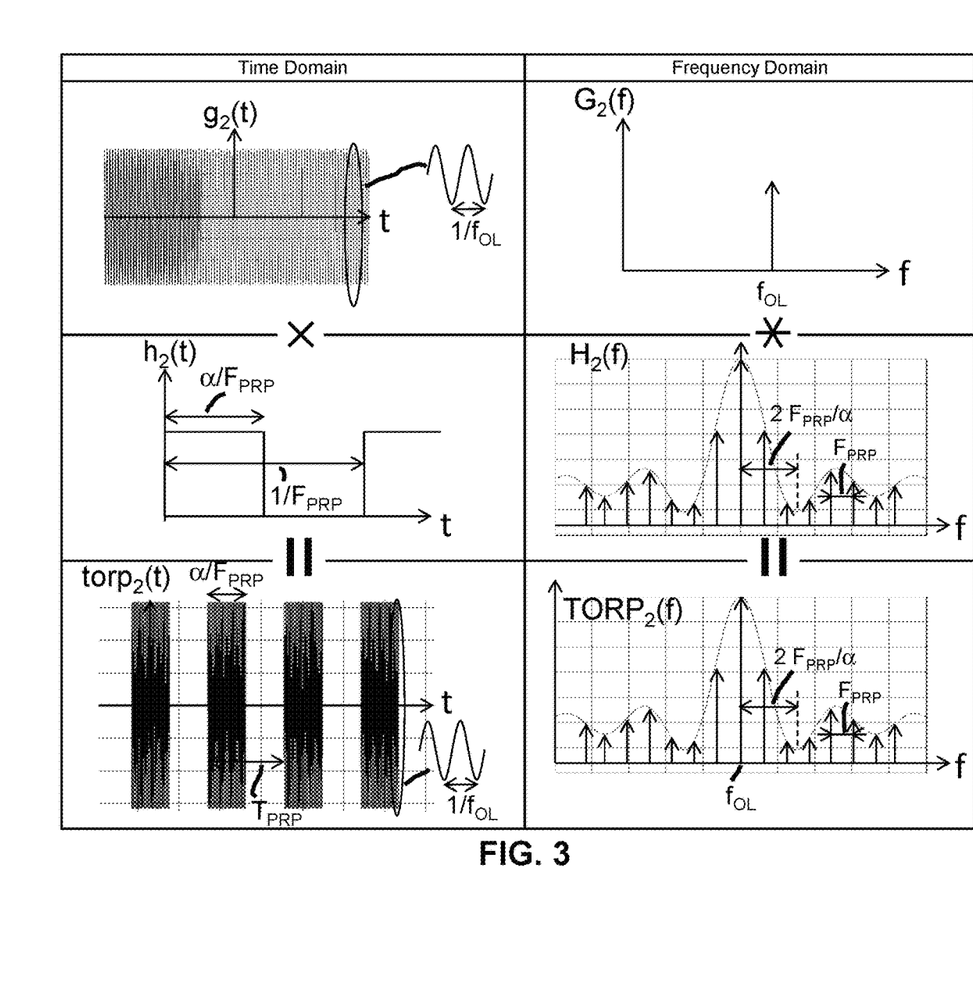

The different signals described above for the non-coherent TORP signal are shown in FIG. 3. In particular, this figure shows that the frequency of the central line of the discretised cardinal sine in signal $TORP_2(f)$ is always equal to $F_{OL}$.

Figure 12:
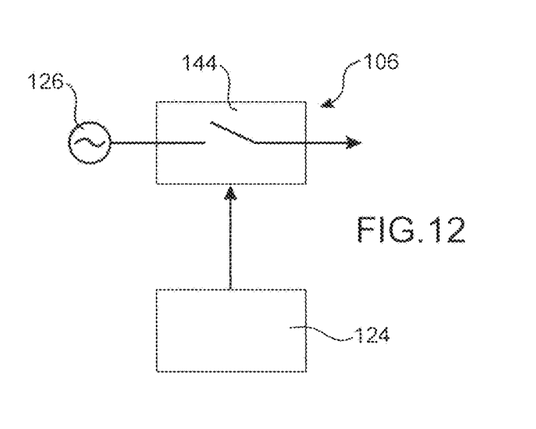
FIG. 12 diagrammatically shows an example embodiment of means of generating a non-coherent TORP signal.

Such a non-coherent TORP signal is obtained for example from a circuit 106 like that shown in FIG. 12. In this circuit 106, the oscillator 126 is powered continuously and outputs a sinusoidal signal at frequency $F_{OL}$. This sinusoidal signal is sent to the input of a switch 144 controlled by the periodic signal with frequency $F_{PRP}$ outputted by the PLL or frequency synthesis 124. The switch 144 is in the closed position periodically (period $1/F_{PRP}$) for a duration corresponding to part of the period $1/F_{PRP}$ and equal to $\alpha/F_{PRP}$, and during which an oscillations train is outputted.

In the transmission part 102 of the device 100, the baseband signal $BB_{TX}$ is multiplied (in the time domain) with the TORP signal by the first multiplier circuit 108 (FIG. 1). The spectrum of the $RF_{TX}$ signal corresponding to the result of this multiplication (that corresponds to a convolution in the frequency domain) is different depending on the width of the spectrum of the $BB_{TX}$ signal compared with the frequency $F_{PRP}$ corresponding to the frequency at which the lines of the TORP signal are repeated.

Figure 4:
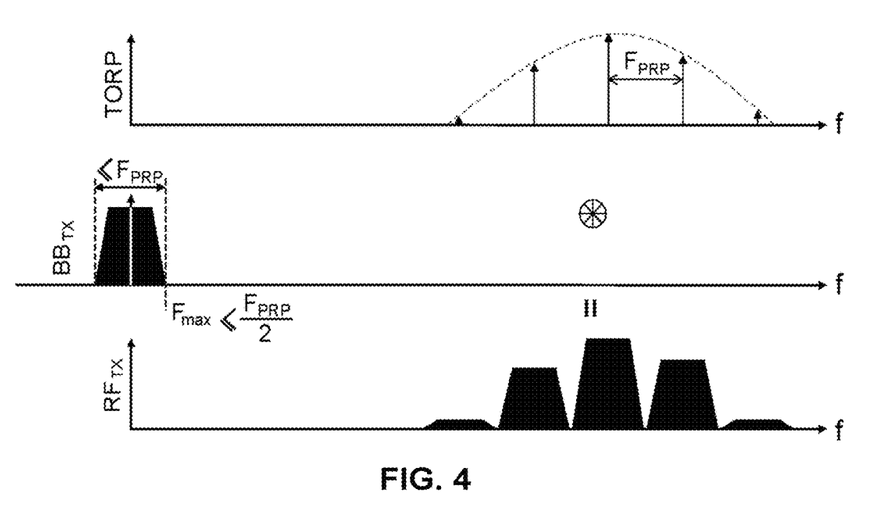
FIGS. 4 and 5 show signal frequency spectra during a signal transmission through the radiofrequency communication device.

FIG. 4 shows the case in which the width of the $BB_{TX}$ signal spectrum is less than or equal to the frequency $F_{PRP}$, in other words the case in which the maximum frequency $F_{max}$ of the $BB_{TX}$ signal is such that $F_{max} \leq F_{PRP}/2$. In this case, it can be seen that the $RF_{TX}$ signal spectrum obtained is composed of several spectral bands centred around frequencies of the lines of the TORP signal that are at a spacing from each other equal to $F_{PRP}$. Since the width of each of these spectral bands is equal to the width of the $BB_{TX}$ signal spectrum that is less than or equal to $F_{PRP}$, there is no overlap between the different spectral bands of the $RF_{TX}$ signal.

Figure 5:
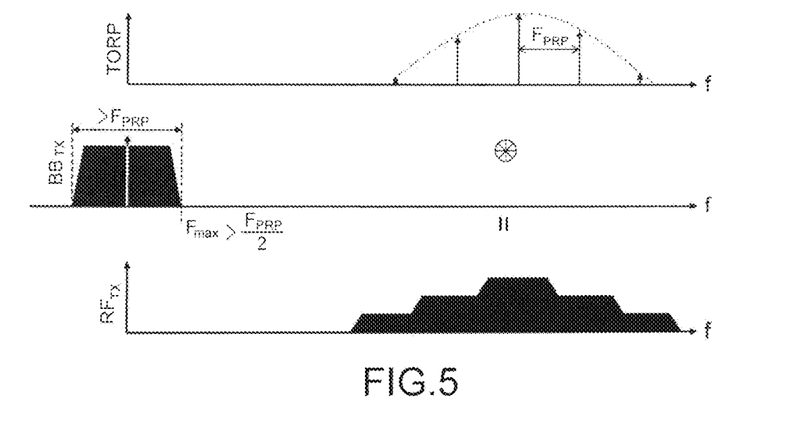

FIG. 5 shows the case in which the width of the $BB_{TX}$ signal spectrum is higher than the frequency $F_{PRP}$, in other words the case in which the maximum frequency $F_{max}$ of the $BB_{TX}$ signal is such that $F_{max} > F_{PRP}/2$. In this case, it can be seen that the $RF_{TX}$ (signal spectrum obtained is formed from several spectral bands centred around the frequencies of the lines of the TORP signal that are at a spacing equal to $F_{PRP}$ from each other. Since the width of each of these spectral bands is equal to the width of the $BB_{TX}$ signal spectrum that is higher than $F_{PRP}$, there is an overlap between adjacent spectral bands of the $RF_{TX}$ (signal.

Similarly, the $BB_{RX}$ signal spectrum corresponding to the result of the multiplication of the TORP signal and the $RF_{RX}$ signal in the time domain is different depending on the width of the $RF_{RX}$ signal frequency spectrum in comparison with the frequency $F_{PRP}$ and on the spectrum shape of the $RF_{RX}$ signal. Since the convolution product is distributive on addition, this convolution in the frequency domain may be considered as being done separately for each line in the TORP signal spectrum with the $RF_{RX}$ signal, the frequency spectrum of the signal obtained corresponding to the sum of these convolutions. Therefore, the resulting $BB_{RX}$ signal spectrum corresponds to the sum of the convolution products between each of the lines of the TORP signal and the $RF_{RX}$ signal spectrum.

Figure 6:
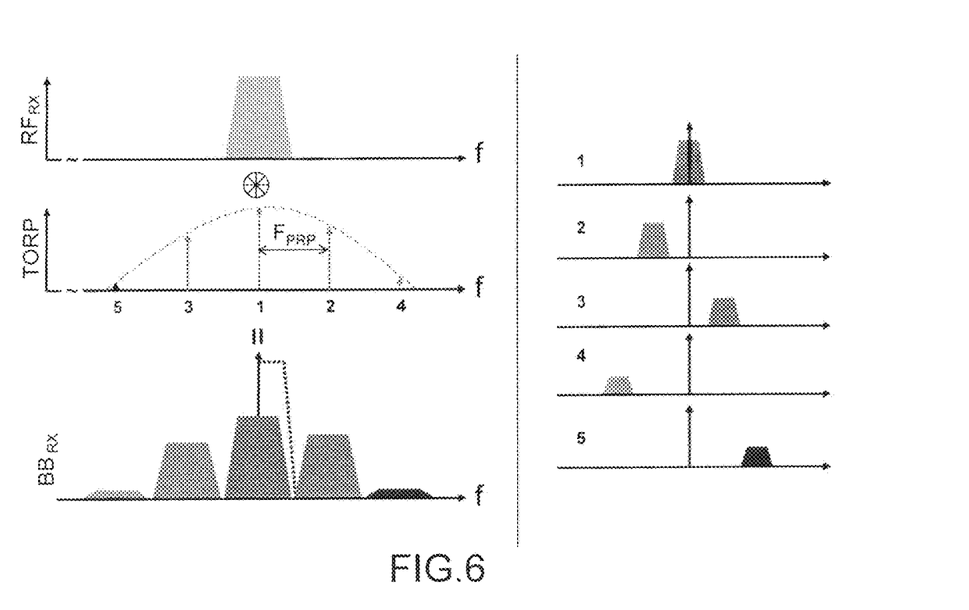
FIGS. 6 to 8 show signal frequency spectra during a signal reception through the radiofrequency communication device.

FIG. 6 illustrates the case of an $RF_{RX}$ signal for which the frequency spectrum occupies a single spectral band with a width less than or equal to the frequency $F_{PRP}$, for an $RF_{RX}$ signal corresponding to a signal transmitted without the use of a TORP signal (because this $RF_{RX}$ signal comprises only one spectral band unlike the $RF_{TX}$ (signals previously described with reference to FIGS. 4 and 5). In this case, by using a TORP signal for which the spectrum comprises one line (preferably the central line with a larger amplitude) located at the central frequency of the $RF_{RX}$ signal, the $BB_{RX}$ signal contains the content of the $RF_{RX}$ received signal around all multiples of $F_{PRP}$ defined by the lines of the TORP signal. Therefore the spectrum of the obtained $BB_{RX}$ signal is formed from several spectral bands that are spaced from each other at a spacing equal to $F_{PRP}$, each of which contains the content of the $RF_{RX}$ signal. The $BB_{RX}$ signal spectrum corresponds to the sum of the contributions of the convolution products of each line of the TORP signal with the $RF_{RX}$ signal, due to the distributivity of the convolution product relative to the addition. Each of these contributions forms one of the spectral bands of the $BB_{RX}$ signal. The right part of FIG. 6 individually shows each of these spectral bands, the numbers indicated at the side of these bands corresponding to the numbers of the lines in the TORP signal spectrum shown on the left part of FIG. 6. Because the width of each of these spectral bands is equal to the width of the $RF_{RX}$ signal spectrum that is less than or equal to $F_{PRP}$, there is no overlap between the different spectral bands of the $BB_{RX}$ signal. Filtering, for example implemented by the second baseband processing circuit 122 and represented symbolically by dashed lines on the $BB_{RX}$ signal in FIG. 6, means that only the spectral band located around the zero frequency (and that corresponds to the highest amplitude spectral band when the central line with the highest amplitude of the TORP signal is at a frequency equal to the central frequency of the $RF_{RX}$ signal) is retrieved, which is sufficient to obtain the transmitted information.

Figure 7:
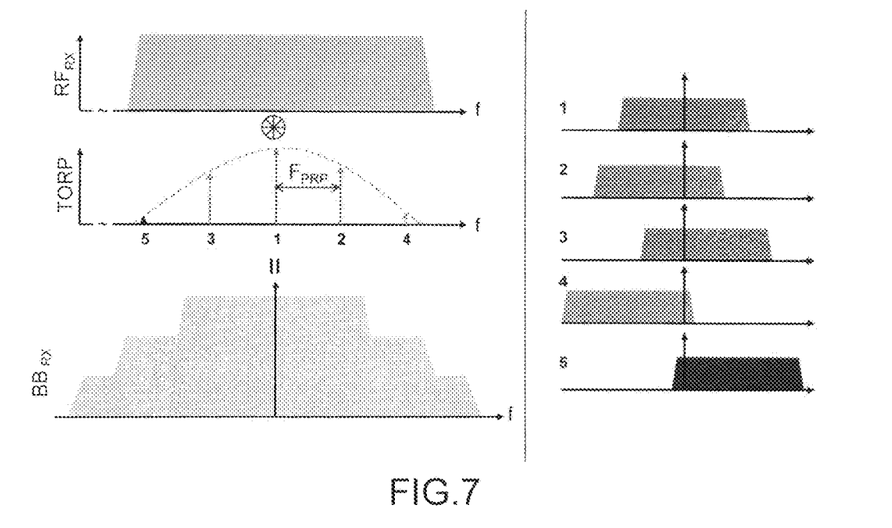

FIG. 7 shows the case of an $RF_{RX}$ signal for which the frequency spectrum occupies a single spectral band wider than the frequency $F_{PRP}$, for an $RF_{RX}$ signal corresponding to a signal transmitted without the use of a TORP signal. In the example shown in FIG. 7, the spectrum of the $RF_{RX}$ signal occupies a spectral band the width of which is equal to several times $F_{PRP}$, and therefore covers several lines in the TORP signal spectrum. In this case, the sum of the convolution products of the different lines in the TORP signal spectrum and this $RF_{RX}$ signal (shown individually on the right part of FIG. 7) gives a complex result with folding around the zero frequency around which the $BB_{RX}$ signal spectrum is centred. Signal processing more complex than a simple filtering is necessary in this case to obtain initial information transmitted in the $RF_{RX}$ signal, in the $BB_{RX}$ signal.

Figure 8:
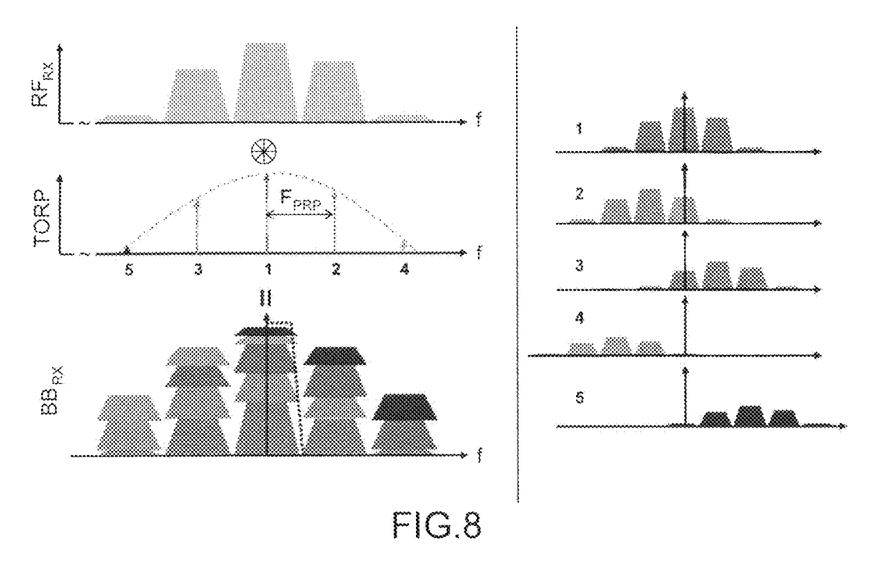

FIG. 8 represents the case of an $RF_{RX}$ signal for which the frequency spectrum occupies several spectral bands each with a width less than or equal to frequency $F_{PRP}$, the $RF_{RX}$ signal corresponding to a signal transmitted using a TORP signal. For example, this $RF_{RX}$ signal corresponds to the $RF_{TX}$ (signal previously described in relation with FIG. 4. In this case, the convolution of the $RF_{RX}$ signal spectrum with each line of the TORP signal spectrum contributes to translating the received spectrum towards the zero frequency and the contributions of each convolution are additive (this addition is shown in FIG. 8 symbolically by the stack of spectral bands on the $BB_{RX}$ signal spectrum). This addition can be used to obtain spectral bands and particularly the spectral band centred around the zero frequency, with a higher amplitude than in the case previously described with reference to FIG. 6. A better signal-to-noise ratio is also obtained given that the noise of the contributions added on the same spectral band is averaged instead of being added. Filtering, for example used by the second baseband processing circuit 122 and symbolically shown in dashed lines on the $BB_{RX}$ signal in FIG. 8, makes it possible to retrieve only the spectral band located around the zero frequency that is sufficient to obtain the initial transmitted information.

It is also possible to receive an $RF_{RX}$ signal for which the frequency spectrum comprises several spectral bands overlapping each other, like the $RF_{TX}$ signal previously described with reference to FIG. 5. In this case, a $BB_{RX}$ signal is obtained for which the spectrum is more complex than that previously described with reference to FIG. 8. In this case, a more complex signal processing than a simple filtering is necessary to restore the initial information transmitted in the $RF_{RX}$ signal, in the $BB_{RX}$ signal.

The circuit 106 of the device 100 may correspond to the circuit 106 previously described with reference to FIG. 9 and used to generate a coherent TORP signal, or may correspond to the circuit 106 previously described with reference to FIG. 12 and used to generate a non-coherent TORP signal.

In one variant of the first embodiment described above, the circuit 106 outputting the TORP signal may be connected only to the transmission part 102 or to the reception part 114 of the device 100. The TORP signal in this case is used only with the part 102 or the part 114 of the device 100. The other part that does not use the TORP signal to make the frequency transposition of the baseband $BB_{TX}$ signal or the $RF_{RX}$ signal may use a periodic signal such as a sinusoidal signal for the multiplication to achieve this frequency transposition. According to another variant, the device 100 may correspond to a signal transmission device only comprising the part 102 or it may correspond to a signal reception device only comprising the part 104.

According to another variant embodiment, the device 100 may comprise two different circuits 106 each coupled to one of the parts 102 and 114. Thus, different TORP signals may be used to perform signal transmission and signal reception.

Figure 9:
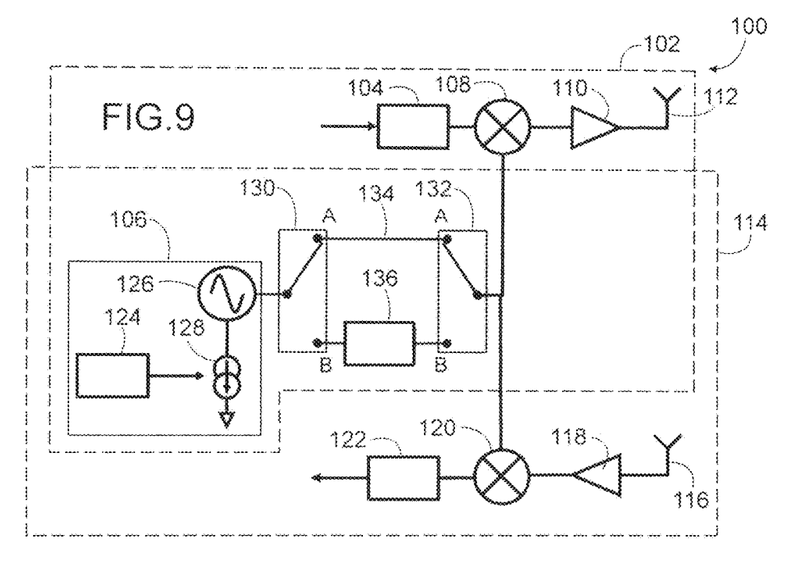
FIGS. 9 to 11 diagrammatically show a radiofrequency communication device according to a second, third and fourth embodiment respectively.

FIG. 9 shows a radiofrequency communication device 100 according to a second embodiment.

As in the first embodiment, the transmission part 102 of the device 100 comprises a first baseband processing circuit 104, the circuit 106 generating the TORP signal, the first multiplier circuit 108, the power amplifier 110 and the transmission antenna 112. As a variant, the circuit 106 shown in FIG. 9 may be replaced by the circuit described previously with reference to FIG. 12 generating a non-coherent TORP signal.

The transmission part 102 of the device 100 also comprises a first switch 130 comprising one input and two outputs (one marked as reference A and the other marked as reference B in FIG. 9), and a second switch 132 comprising two inputs (one marked with reference A and the other marked with reference B) and one output. The two switches 130 and 132 are controlled by the same control signal in order to obtain two configurations.

In a first configuration (corresponding to the case shown in FIG. 9), the input of the first switch 130 is connected to the first output referenced A of the first switch 130, and the first input referenced A of the second switch 132 is connected to the output of the second switch 132. Since the output of the circuit 106 is connected to the input of the first switch 130 and the output of the second switch 132 is connected to the input of the first multiplier circuit 108 and the first output A of the first switch 130 is electrically connected to the first input A of the second switch 132 through a simple electrical connection 134 for example composed of a conducting wire or track, in this first configuration the TORP signal outputted by the circuit 106 is applied to the input of the multiplier circuit 108. In this first configuration, operation of the transmission part 102 of the device 100 according to the second embodiment is similar to that described previously for the device 100 according to the first embodiment.

In a second configuration, the input of the first switch 130 is connected to the second output referenced B of the first switch 130, and the second input referenced B of the second switch 132 is connected to the output of the second switch 132. The second output of the first switch 130 is connected to the input of an injection locked oscillator (ILO) circuit 136 that generates a periodic signal from the TORP signal, for which the frequency spectrum comprises a principal line corresponding to one of the lines in the TORP signal spectrum and acts as a passband filter applied to the TORP signal that rejects lines other than the principal line of said periodic signal, from the frequency spectrum of said periodic signal.

Thus, in this second configuration, the ILO 136 can retrieve one of the frequencies of the TORP signal and therefore can output a periodic signal to the input of the first multiplier circuit 108, for example a sinusoidal signal, for which the spectrum has a principal line for which the amplitude has a value very much higher than the amplitudes of adjacent lines if there are any (the presence of these adjacent lines being due to the fact that the ILO 136 does not reject these adjacent lines perfectly). In this second configuration, operation of the transmission part 102 of the device 100 is similar to operation of the device described in document WO 2013/079685 A1. Therefore, unlike the first configuration, the spectrum of the periodic signal applied to the input of the first multiplier circuit 108 in this second configuration only comprises a single line (considering that the adjacent lines present, if any, have a negligible amplitude relative to the amplitude of the principal line), which prevents spectrum spreading of the transmitted $RF_{TX}$ (signal.

Therefore in this second embodiment, the user can choose between the first configuration in which the consumption of the device 100 is reduced because the ILO 136 is not used, and the second configuration which, at the price of a higher consumption, transmits an RF signal for which the spectrum occupies a narrower width, which may be useful for example when the transmission channel reserved for transmission of the $RF_{TX}$ signal is narrow or to prevent pollution of adjacent channels.

As in the first embodiment, the reception part 114 of the device 100 comprises the reception antenna 116, the low noise amplifier 118, the second multiplier circuit 120 and the second baseband processing circuit 122. As for the first multiplier circuit 108 in the transmission part 104, the second multiplier circuit 120 receives either the TORP signal directly as input when the switches 130 and 132 are in the first configuration, or the signal outputted by the ILO 136. In this configuration, only one spectral band of the $RF_{RX}$ signal can be folded rather than all bands.

The variants of the first embodiment previously described (use of the TORP signal only in transmission or reception, the device 100 corresponding only to a transmission or reception device, one or two circuits 106 generating coherent or non-coherent TORP signals) may also be applied for this second embodiment.

According to another variant of this second embodiment, it is possible that the output of the second switch 132 is only connected to the input of one of the two multiplier circuits 108, 120, and that the input of the other multiplier circuit 108, 120 is directly connected to the output of the circuit 106 or the output of the ILO 136. Thus, the choice between the first and second configurations of switches 130 and 132 only concerns the transmission part 102 or the reception part 114, the other part not being affected by this configuration change.

In another variant, the device 100 may comprise two other switches connected to the circuit 106, to the electrical connection 134 and to the ILO 136 in a similar manner to the switches 130 and 132, but that are controlled to be in the first or the second configuration independently of the configuration in which the switches 130 and 132 are. In this case, the output of the second switch 132 may be connected only to the input of the first multiplier circuit 108 (and not to the input of the second multiplier circuit 120), and the output of the second of the other two switches is only connected to the input of the second multiplier circuit 120 (and not to the input of the first multiplier circuit 108). With this variant, the emission part 102 and the reception part 114 can each operate in the first or second configuration independently of each other.

Figure 10:
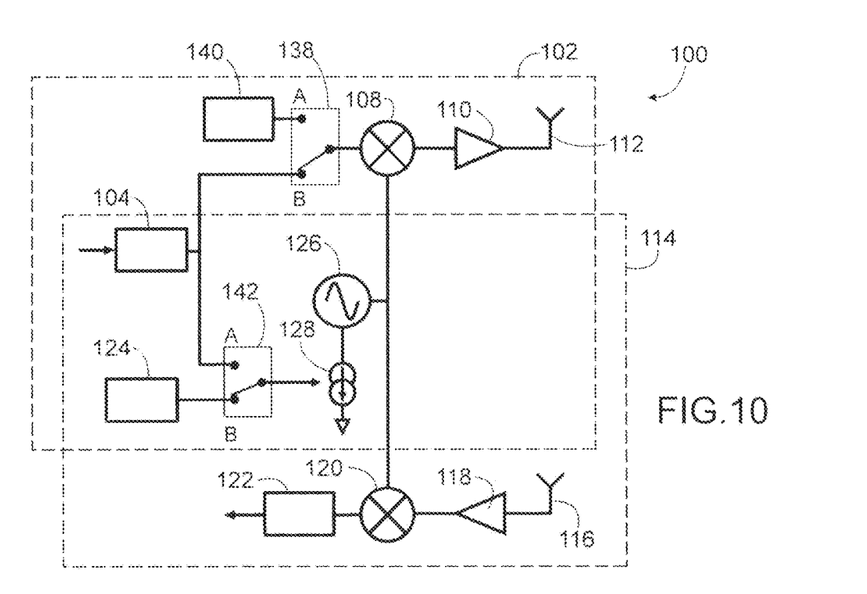

FIG. 10 shows a third embodiment of a signal transmission and reception device 100.

As in the first embodiment, the transmission part 102 of the device 100 comprises the first baseband processing circuit 104, the circuit 106 generating the TORP signal (formed by the PLL or frequency synthesis 124, the oscillator 126 and the controlled electrical power supply means 128 as in FIG. 9), the first multiplier circuit 108, the power amplifier 110 and the transmission antenna 112.

The transmission part 102 of the device 100 also comprises a first switch 138 comprising a first input A connected to the output of a circuit 140 outputting a signal with a constant amplitude on this output corresponding to the amplitude of a bit with value "1" and a second input B connected to the output of the circuit 104 on which the $BB_{TX}$ signal is outputted, and an output connected to an input of the first multiplier circuit 108. The transmission part 102 also comprises a second switch 142 comprising a first input A connected to the output of the circuit 104, a second input B connected to the output of the PLL 124 and an output connected to the control input of the controlled electrical power supply means 128.

In a first configuration (that corresponds to the case shown in FIG. 10), each switch 138, 142 outputs the signal applied onto its input B. In this case, the electrical power supply means 128 are controlled by the signal outputted by the PLL 124 and the first multiplier 108 receives the TORP signal and the $BB_{TX}$ signal as input. In this first configuration, operation of the transmission part 102 of the device 100 according to the third embodiment is similar to that described previously for the device 100 according to the first embodiment.

In a second configuration, each switch 138, 142 outputs the signal applied on its input A. In this case, the electrical power supply means 128 are controlled by the $BB_{TX}$ signal, and the first multiplier 108 receives the signal outputted by the oscillator 126 (which in this case is not a TORP type signal considering that the means 128 are controlled by the $BB_{TX}$ signal) and the signal with value "1" outputted by the circuit 140, on its input. Therefore in this second configuration, the transmission part 102 makes an OOK (On Off Keying) modulation of the $BB_{TX}$ signal directly, and then a transmission of this modulated signal.

Therefore in this third embodiment, the user can choose between two transmission modes of the $BB_{TX}$ signal: either in OOK modulation, or transposed into RF frequency. In OOK modulation, data to be transmitted directly control the TORP signal generator and the signal is generated directly in the RF band.

As in the first embodiment, the reception part 114 of the device 100 comprises the reception antenna 116, the low noise amplifier 118, the second multiplier circuit 120 and the second baseband processing circuit 122. In this case, the reception part 114 is used when the switches are in the first configuration, in other words when the oscillator 126 outputs the TORP signal.

The variants of the first and the second embodiments described above may also be applied for the third embodiment.

According to another variant of this third embodiment, the reception part 114 may comprise another circuit generating a TORP signal different from that used for the transmission, so that when the transmission part 102 makes an OOK modulation and therefore the oscillator 126 does not output a TORP signal, the reception part 114 can still make a signal reception using a TORP signal.

According to another variant embodiment of the transmission part 102 of the device 100 according to this second embodiment, the circuit 140 may be replaced by a symbol generator capable of transmitting bits of information to be transmitted in a synchronised manner with the signal outputted by the PLL 124. The output of this symbol generator is connected to the first input A to the first switch 138 through a delay line or DLL, that synchronises the TORP signal outputted by the oscillator 126 and the signal outputted by the symbol generator, at the first multiplier circuit 108. Furthermore in this variant, the device 100 does not comprise the second switch 142 because the signal outputted by the PLL 124 is still applied on the control input of the power supply means 128. This other variant may be used when the TORP signal has to be synchronised with the signal containing information to be sent, in the second configuration making an OOK modulation of the signal to be transmitted.

Figure 11:
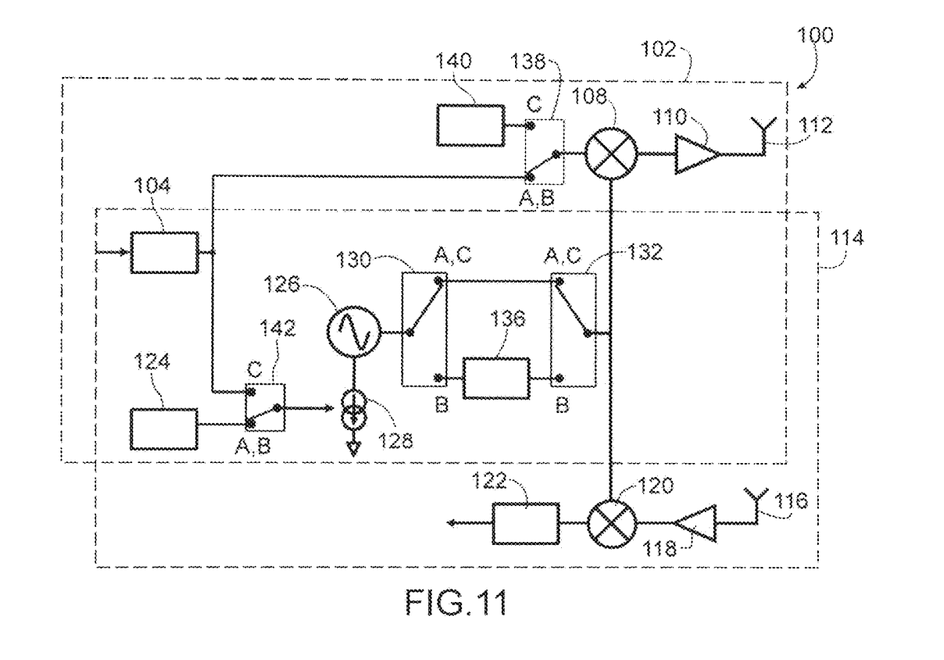

FIG. 11 shows a fourth embodiment of a signal transmission and reception device 100.

The device 100 according to the fourth embodiment comprises elements previously described with reference to the second embodiment, and those previously described with reference to the third embodiment. Thus, in a first configuration in which each of the switches 130, 132, 138 and 142 are switched in a state in which their input or output referenced A in FIG. 11 is connected to other elements of the device 100, operation of the device 100 according to the fourth embodiment is similar to that previously described for the device 100 according to the second embodiment in the first configuration (TORP signal applied directly to the input of the multiplier circuits 108 and 120 for the transmission and reception of signals). In a second configuration in which each of the switches 130, 132, 138 and 142 are switched in a state in which their input or output referenced B in FIG. 11 is connected to the other elements of the device 100, operation of the device 100 in the fourth embodiment is similar to that previously described for the device 100 according to the second embodiment in the second configuration (TORP signal applied to the input of the ILO 136, the signal outputted by the ILO 136 being applied to the input of the multiplier circuits 108 and 120 for the transmission and reception of signals). In a third configuration in which each of the switches 130, 132, 138 and 142 are switched in a state in which their input or output referenced C in FIG. 11 is connected to the other elements of the device 100, operation of the device 100 according to the fourth embodiment is similar to that described above for the device 100 according to the third embodiment in the second configuration (OOK modulation of the signal to be transmitted).

The different variants described above for the previous embodiments are applicable in a similar manner to the fourth embodiment of the device 100.

The device 100 according to the different embodiments described above may be made using the 65 nm CMOS technology to make transmissions at frequency ranges between about 57 GHz and 66 GHz.

The invention claimed is:

1. A radiofrequency communication device comprising:
at least one TORP signal generation circuit, a TORP signal generated by the at least one TORP signal generation circuit corresponding to oscillations trains periodically repeated at a frequency FPRP for which the oscillation frequency is FOL>FPRP and for which each oscillations train lasts for a duration of less than 1/FPRP, the TORP signal having a zero value between the oscillation trains, and
at least one multiplier circuit including an input coupled to an output of said at least one TORP signal generation circuit applying the TORP signal on said input of the at least one multiplier circuit such that the multiplier circuit is configured to multiply the TORP signal with at least one of a baseband signal comprising information intended to be transmitted by the radiofrequency communication device and a radiofrequency signal intended to be received by the radiofrequency communication device.

2. The device according to claim 1, wherein said at least one multiplier circuit corresponds to a first multiplier circuit configured to multiply the TORP signal with the baseband signal and to a second multiplier circuit configured to multiply the TORP signal with the radiofrequency signal.

3. The device according to claim 2, wherein said at least one TORP signal generation circuit corresponds to a first TORP signal generation circuit for which one output is coupled to an input of the first multiplier circuit and to a second TORP signal generation circuit for which one output is coupled to an input of the second multiplier circuit.

4. The device according to claim 1, further comprising:
at least two switches configured to couple the output of said at least one TORP signal generation circuit with the input of at least one of the multiplier circuits through direct interconnection or via a first circuitry configured to use the TORP signal to generate a periodic signal for which a frequency spectrum comprises a principal line corresponding to one of the lines in the TORP signal spectrum and configured to act as a passband filter applied to the TORP signal and configured to reject lines other than the principal line of said periodic signal from the frequency spectrum of said periodic signal.

5. The device according to claim 4, wherein the first circuitry configured to generate said periodic signal comprises at least one injection locked oscillator configured to receive the TORP signal as input and to be at least periodically locked to a frequency at which the principal line of said periodic signal is located.

6. The device according to claim 1, wherein said at least one TORP signal generation circuit comprises at least:

an oscillator configured to generate a periodic signal with frequency FOL, and
a second circuitry that can be controlled by a periodic signal with frequency FPRP, and that is connected to an electrical power supply input of the oscillator such that the second circuitry generates a non-zero power supply voltage of the oscillator only during part of each period 1/FPRP, or that is connected to an output of the oscillator such that the second circuitry cuts off an electrical connection between the output of oscillator and an output of the TORP signal generation circuit during only part of each period 1/FPRP.

7. The device according to claim 6, further comprising:
at least one switch configured to output either the periodic signal with frequency FPRP in a first configuration, or the baseband signal in a second configuration, onto a control input of the second circuitry of said at least one TORP signal generation circuit, and at least one switch configured to output either the baseband signal in the first configuration, or a constant amplitude signal corresponding to the amplitude of a bit with value in the second configuration, onto an input of the multiplier circuit.

8. The device according to claim 6, further comprising:
at least one phase locked loop configured to output the periodic signal with frequency FPRP.

9. The device according to claim 1, wherein the output of said at least one TORP generation circuit is directly coupled to the input of said at least one multiplier circuit.

10. The device according to claim 1, wherein the TORP signal has the zero value during an entirety of an interval between the oscillation trains.

11. A radiofrequency communication method, comprising:
generating, in at least one TORP generation circuit, at least one TORP signal corresponding to oscillations trains periodically repeated at a frequency FPRP of which the oscillations are at frequency FOL>FPRP and for which each oscillations train has a duration of less than 1/FPRP, the at least one TORP signal having a zero value between the oscillation trains;
applying the TORP signal to an input of at least one multiplier circuit; and
multiplying, in the at least one multiplier circuit, the at least one TORP signal with at least one of a baseband signal comprising information to be transmitted and a received radiofrequency signal.

12. The method according to claim 11, further comprising:
implementing at least one of a first multiplication between a first TORP signal and the baseband signal, and a second multiplication between a second TORP signal and the received radiofrequency signal.

* * * * *